(12) United States Patent
Ushikura et al.

(10) Patent No.: US 10,989,818 B2
(45) Date of Patent: Apr. 27, 2021

(54) RADIATION DETECTOR AND RADIOGRAPHIC IMAGING APPARATUS

(71) Applicant: FUJIFILM Corporation, Tokyo (JP)

(72) Inventors: Shinichi Ushikura, Kanagawa (JP); Keiichi Akamatsu, Kanagawa (JP); Haruyasu Nakatsugawa, Kanagawa (JP); Shunsuke Kodaira, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 122 days.

(21) Appl. No.: 16/369,781

(22) Filed: Mar. 29, 2019

(65) Prior Publication Data

US 2019/0302279 A1 Oct. 3, 2019

(30) Foreign Application Priority Data

Apr. 2, 2018 (JP) .............................. JP2018-071221

(51) Int. Cl.
*G01T 1/20* (2006.01)
*G01T 1/24* (2006.01)

(52) U.S. Cl.
CPC . *G01T 1/20* (2013.01); *G01T 1/24* (2013.01)

(58) Field of Classification Search
CPC ................................... G01T 1/20; G01T 1/24
USPC .................................................... 250/370.11
See application file for complete search history.

(56) References Cited

U.S. PATENT DOCUMENTS

| 6,153,823 A * | 11/2000 | Shiozaki ................... H02J 7/35 |
| | | 136/249 |
| 2016/0282482 A1 | 9/2016 | Kobayashi et al. |
| 2017/0122502 A1* | 5/2017 | Cok ........................ G09G 3/32 |
| 2018/0275290 A1* | 9/2018 | Ushikura ............... G01T 1/2023 |
| 2019/0189728 A1* | 6/2019 | Lee ..................... H01L 51/5253 |

FOREIGN PATENT DOCUMENTS

JP 2016-180707 A 10/2016

* cited by examiner

*Primary Examiner* — David P Porta
*Assistant Examiner* — Gisselle M Gutierrez
(74) *Attorney, Agent, or Firm* — Birch, Stewart, Kolasch & Birch, LLP

(57) ABSTRACT

A radiation detector includes: a sensor substrate including a flexible base material and a layer which is provided on a first surface of the base material and in which plural pixels, which accumulate electrical charges generated in accordance with light converted from radiation, are formed; a conversion layer that is provided on the first surface side of the sensor substrate to convert radiation into the light; and a protective film that covers a portion ranging from an opposite surface of the conversion layer opposite to a side where the sensor substrate is provided, to a corresponding position, corresponding to a position of an end part of the conversion layer, on a second surface opposite to the first surface of the base material.

17 Claims, 7 Drawing Sheets

RADIATION DETECTOR AND RADIOGRAPHIC IMAGING APPARATUS

CROSS-REFERENCE TO RELATED APPLICATION

This application claims priority from Japanese Patent Application No. 2018-071221, filed on Apr. 2, 2018, the disclosure of which is incorporated by reference herein in its entirety.

BACKGROUND

Field of the Invention

The present invention relates to a radiation detector and a radiographic imaging apparatus.

Related Art

In the related art, radiographic imaging apparatuses that perform radiographic imaging for medical diagnosis have been known. A radiation detector for detecting radiation transmitted through a subject and generating a radiographic image is used for such radiographic imaging apparatuses.

As the radiation detector, there is one comprising a conversion layer, such as a scintillator, which converts radiation into light, and a sensor substrate in which a plurality of pixels, which accumulate electrical charges generated in accordance with light converted in the conversion layer, are provided.

It is known that a flexible base material is used for the sensor substrate of the radiation detector. By using the flexible base material, for example, there is a case where the weight of the radiographic imaging apparatus (radiation detector) can be reduced and imaging of a subject becomes easy.

In a case where the flexible base material is used for the sensor substrate, deflection occurs in the base material, that is, the sensor substrate. As the deflection occurs in the sensor substrate, for example, there is a case where the durability and the moisture resistance of the conversion layer degrade.

Thus, as the technique of enhancing the stiffness of the sensor substrate, for example, JP2016-180707A discloses a technique of providing a buffer part between a top plate of a housing, which houses the radiation detector, and the sensor substrate, thereby enhancing the stiffness of the sensor substrate, and allowing the top plate and the sensor substrate to be mutually reinforced.

Meanwhile, in a case where the sensor substrate using the flexible base material is deflected, discontinuous deflection such that the sensor substrate is partially or locally deflected or distorted occurs easily compared to a sensor substrate using a non-flexible base material. This discontinuous deflection tends to occur easily in the vicinity of an outer peripheral part of the conversion layer.

SUMMARY

An object of the present disclosure is to provide a radiation detector and a radiographic imaging apparatus capable of suppressing influence of discontinuous deflection even in a case where a flexible base material is used for a sensor substrate, compared to a configuration in which a portion ranging from a surface of a conversion layer opposite to a side where the sensor substrate is provided, to a corresponding position, corresponding to a position of an end part of the conversion layer, on a second surface opposite to the first surface of the base material is not covered.

In order achieve the above object, a radiation detector of a first aspect of the present discloses comprises a sensor substrate including a flexible base material and a layer which is provided on a first surface of the base material and in which a plurality of pixels, which accumulate electrical charges generated in accordance with light converted from radiation, are formed; a conversion layer that is provided on the first surface side of the sensor substrate to convert radiation into the light; and a protective film that covers a portion ranging from an opposite surface of the conversion layer opposite to a side where the sensor substrate is provided, to a corresponding position, corresponding to a position of an end part of the conversion layer, on a second surface opposite to the first surface of the base material.

Additionally, in the radiation detector of a second aspect of the present disclosure based on the radiation detector of the first aspect, the conversion layer includes a pixel region that is a region where the plurality of pixels are formed, on the first surface of the base material, and covers a range wider than the pixel region.

Additionally, in the radiation detector of a third aspect of the present disclosure based on the second aspect, the protective film does not cover a region, corresponding to the pixel region, on the second surface of the base material.

Additionally, in the radiation detector of a fourth aspect of the present disclosure based on the second aspect, the protective film covers a portion of a region, corresponding to the pixel region, on the second surface of the base material.

Additionally, in the radiation detector of a fifth aspect of the present disclosure based on the second aspect, a position of an end part of the protective film is a position between a region, corresponding to the pixel region, on the second surface of the base material, and the corresponding position.

Additionally, in the radiation detector of a sixth aspect of the present disclosure based on the first aspect, the protective film includes a first protective film that covers the opposite surface of the conversion layer and a side surface of the conversion layer, and a second protective film that covers at least a region up to the corresponding position on the second surface of the base material, including the entire first protective film.

Additionally, in the radiation detector of a seventh aspect of the present disclosure based on the first aspect, the protective film includes a first protective film that covers the opposite surface of the conversion layer and a side surface of the conversion layer, and a second protective film that covers a region ranging from a region including an end part of the first protective film to at least a region up to the corresponding position on the second surface of the base material.

Additionally, in the radiation detector of an eighth aspect of the present disclosure based on the seventh aspect, the first protective film and the second protective film are bonded together with an adhesive.

Additionally, the radiation detector of a ninth aspect of the present disclosure based on the first aspect further comprises a third protective film provided on the second surface side of the base material.

Additionally, in the radiation detector of a tenth aspect of the present disclosure based on the ninth aspect, the protective film covers up to at least a region of the third protective film corresponding to the corresponding position on the second surface of the base material.

Additionally, in the radiation detector of an eleventh aspect of the present disclosure based on the ninth aspect, the third protective film covers a region, which is not covered with the protective film, on the second surface of the base material.

Additionally, in the radiation detector of a twelfth aspect of the present disclosure based on any one aspect of the ninth to eleventh aspects, the third protective film is at least one of a moisture resistance film or an antistatic film.

Additionally, the radiation detector of a thirteenth aspect of the present disclosure based on the first aspect further comprises a supporting member that supports the base material from the second surface side of the base material via the protective film.

Additionally, in the radiation detector of a fourteenth aspect of the present disclosure based on the thirteenth aspect, the supporting member is provided outside a pixel region, which is a region where the plurality of pixels are formed, on the first surface of the base material.

Additionally, in the radiation detector of a fifteenth aspect of the present disclosure based on at least one aspect of the first to fourteenth aspects, the conversion layer includes CsI.

Additionally, a radiographic imaging apparatus of a sixteenth aspect of the present disclosure comprises the radiation detector according to any one aspect of the first to fifteenth aspects of the present disclosure; a control unit that outputs control signals for reading electrical charges accumulated in the plurality of pixels; a drive unit that outputs driving signals for reading the electrical charges from the plurality of pixels in accordance with the control signals; and a signal processing unit to which electrical signals according to the electrical charges read from the plurality of pixels are input, and which generates and outputs image data according to the input electrical signals.

Additionally, in the radiographic imaging apparatus of a seventeenth aspect of the present disclosure based on the sixteenth aspect, the control unit and the radiation detector are provided side by side in a direction intersecting a lamination direction in which the base material, the layer in which the plurality of pixels are formed, and the conversion layer are arranged in the radiation detector.

Additionally, the radiographic imaging apparatus of an eighteenth aspect of the present disclosure based on the sixteenth aspect further comprises a power source unit that supplies electrical power to at least one of the control unit, the drive unit, or the signal processing unit. The power source unit, the control unit, and the radiation detector are provided side by side in a direction intersecting a lamination direction in which the sensor substrate, the conversion layer, and a stress neutral-plane adjusting member are arranged in the radiation detector.

According to the first aspect of the present disclosure, influence of discontinuous deflection can be suppressed even in a case where the flexible base material is used for the sensor substrate compared to a configuration in which the protective film does not cover the portion ranging from the surface of the conversion layer opposite to the side where the sensor substrate is provided, to the corresponding position, corresponding to the position of the end part of the conversion layer, on the second surface opposite to the first surface of the base material.

According to the second aspect of the present disclosure, the image quality of the radiographic image can be improved compared to a case where the conversion layer covers a range narrower than the pixel region.

According to the third aspect of the present disclosure, the image quality of the radiographic image can be improved compared to a case where the protective film covers the region, corresponding to the pixel region, on the second surface of the base material.

According to the fourth aspect of the present disclosure, the discontinuous deflection of the base material can be suppressed compared to a case where the protective film covers the entire region, corresponding to the pixel region, on the second surface of the base material.

According to the fifth aspect of the present disclosure, the discontinuous deflection of the base material can be further suppressed compared to a case where the position of the end part of the protective film is not located between the region, corresponding to the pixel region, on the second surface of the base material and the corresponding position.

According to the sixth aspect of the present disclosure, the discontinuous deflection of the base material can be suppressed compared to a case where the protective film does not include the first protective film and the second protective film.

According to the seventh aspect of the present disclosure, the discontinuous deflection of the base material can be suppressed compared to a case where the protective film does not include the first protective film and the second protective film.

According to the eighth aspect of the present disclosure, moisture resistance can be enhanced compared to a case where the first protective film and the second protective film are not bonded together with the adhesive.

According to the ninth aspect of the present disclosure, the discontinuous deflection of the base material can be further suppressed compared to a case where the third protective film is not provided on the second surface side of the base material.

According to the tenth aspect of the present disclosure, the discontinuous deflection of the base material can be further suppressed compared to a case where the protective film does not cover up to the region of the third protective film, corresponding to the corresponding position, on the second surface of the base material.

According to the eleventh aspect of the present disclosure, the height of the second surface can be uniformized compared to a case where the third protective film does not cover the region on the second surface of the base material that is not covered with the protective film.

According to the twelfth aspect of the present disclosure, a moisture resistance effect and an antistatic effect for the sensor substrate can be enhanced compared to a case where the third protective film is not at least one of a moisture resistance film or an antistatic film.

According to the thirteenth aspect of the present disclosure, the discontinuous deflection of the base material can be further suppressed compared to a case where the base material is not supported from the second surface side via the protective film by the supporting member.

According to the fourteenth aspect of the present disclosure, the image quality of the radiographic image can be improved compared to a case where the supporting member is provided within the pixel region.

According to the fifteenth aspect of the present disclosure, the efficiency of conversion from radiation to visible light can be made high compared to a case where the conversion layer does not include CsI.

According to the sixteenth aspect of the present disclosure, the influence of the discontinuous deflection can be suppressed even in a case where the flexible base material is used for the sensor substrate compared to a case where a radiation detector different from the radiation detector described in any one aspect of the first aspect to the fifteenth aspect is comprised.

According to the seventeenth aspect of the present disclosure, the influence of the discontinuous deflection can be suppressed even in a case where the control unit and the radiation detector are provided side by side in the direction intersecting the lamination direction in which the base material, the layer in which the plurality of pixels are formed, and the conversion layer are arranged in the radiation detector, and the flexible base material is used for the sensor substrate, compared to a case where a radiation detector different from the radiation detector described in any one aspect of the first aspect to the fifteenth aspect is comprised.

According to the eighteenth aspect of the present disclosure, the influence of the discontinuous deflection can be suppressed even in a case where the power source unit, the control unit, and the radiation detector are provided side by side in the direction intersecting the lamination direction in which the sensor substrate, the conversion layer, and the stress neutral-plane adjusting member are arranged in the radiation detector, and the flexible base material is used for the sensor substrate, compared to a case where a radiation detector different from the radiation detector described in any one aspect of the first aspect to the fifteenth aspect is comprised.

DETAILED DESCRIPTION

Hereinafter, embodiments of the invention will be described in detail with reference to the drawings. In addition, the present embodiments do not limit the invention.

First Embodiment

A radiographic imaging apparatus of the present embodiment has a function of capturing a radiographic image of an object to be imaged, by detecting radiation transmitted through a subject, which is the object to be imaged, and outputting image information representing a radiographic image of the subject.

Figure 1:
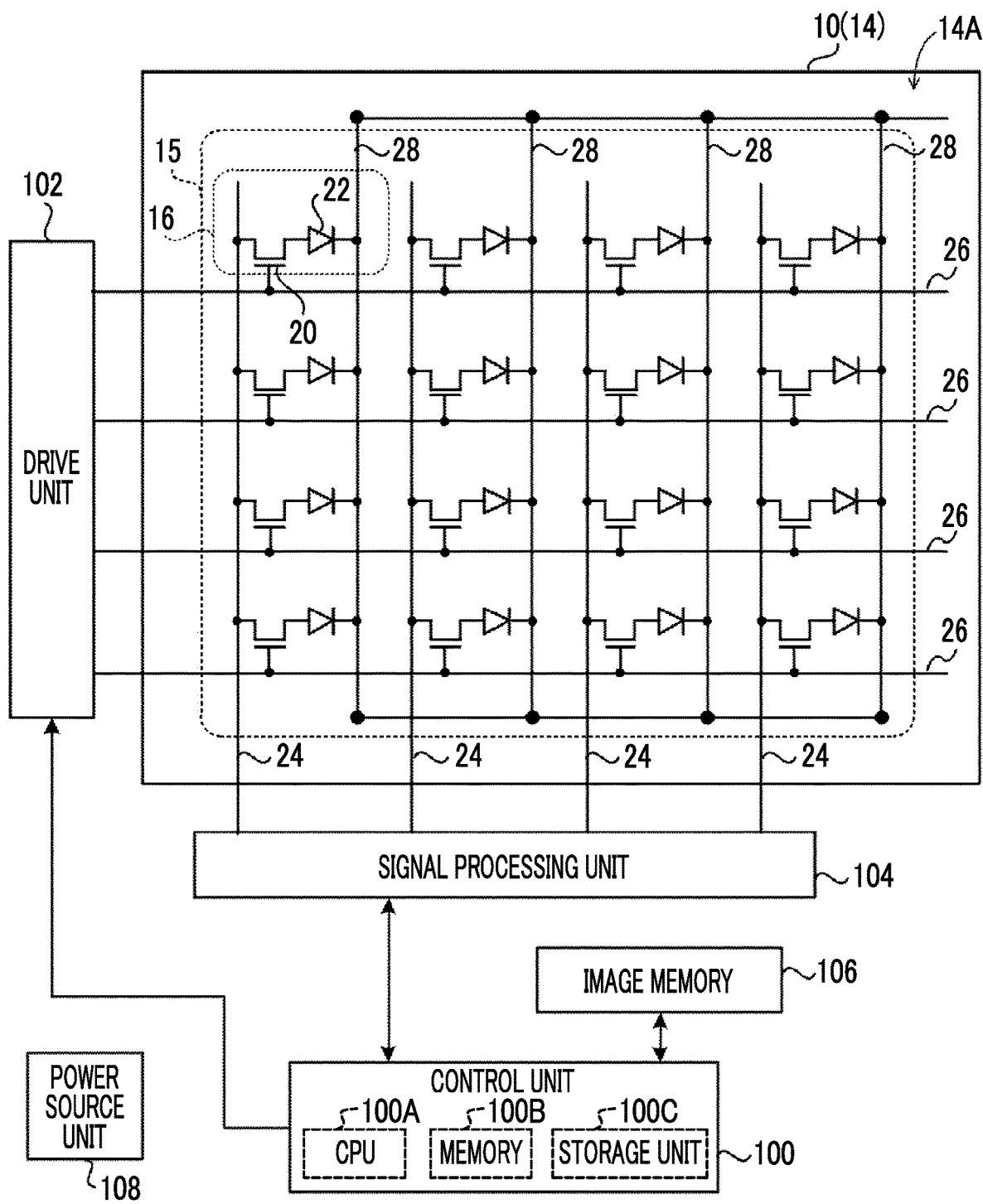
FIG. 1 is a block diagram illustrating an example of the configuration of main parts of an electrical system in a radiographic imaging apparatus of a first embodiment.

First, the outline of an example of the configuration of an electrical system in the radiographic imaging apparatus of the present embodiment will be described with reference to FIG. 1. FIG. 1 is a block diagram illustrating an example of the configuration of main parts of the electrical system in the radiographic imaging apparatus of the present embodiment.

As illustrated in FIG. 1, the radiographic imaging apparatus 1 of the present embodiment comprises a radiation detector 10, a control unit 100, a drive unit 102, a signal processing unit 104, an image memory 106, and a power source unit 108.

The radiation detector 10 comprises a sensor substrate 12 (refer to FIG. 3, details thereof will be described below) and a conversion layer 30 (refer to FIG. 3) that converts radiation into light. The sensor substrate 12 comprises a flexible base material 14 and a plurality of pixels 16 provided on a first surface 14A of the base material 14. In addition, in the following, the plurality of pixels 16 may be simply referred to as "pixels 16".

As illustrated in FIG. 1, each pixel 16 of the present embodiment comprises a sensor part 22 that generates and accumulates an electrical charge in accordance with the light converted by the conversion layer, and a switching element 20 that reads the electrical charge accumulated in the sensor part 22. In the present embodiment, as an example, a thin film transistor (TFT) is used as the switching element 20. For that reason, in the following, the switching element 20 is referred to as a "TFT 20". In the present embodiment, a layer in which the pixels 16 are formed on the first surface 14A of the base material 14 is provided as a flattened layer in which the sensor parts 22 and the TFTs 20 are formed. In the following, there is a case where the layer in which the pixels 16 are formed is also referred to as the "pixels 16" for convenience of description.

The pixels 16 are two-dimensionally disposed in one direction (a scanning wiring direction corresponding to a transverse direction of FIG. 1, hereinafter referred to as a "row direction"), and a direction intersecting the row direction (a signal wiring direction corresponding to the longitudinal direction of FIG. 1, hereinafter referred to as a "column direction") in an active area 15 of the sensor substrate 12. Although an array of the pixels 16 are illustrated in a simplified manner in FIG. 1, for example, 1024×1024 pixels 16 are disposed in the row direction and the column direction.

Additionally, a plurality of scanning wiring lines 26, which are provided for respective rows of the pixels 16 to control switching states (ON and OFF) of the TFTs 20, and a plurality of signal wiring lines 24, which are provided for respective columns of the pixels 16 and from which electrical charges accumulated in the sensor parts 22 are read, are provided in a mutually intersecting manner in the radiation detector 10. The plurality of scanning wiring lines 26 are respectively connected to a drive unit 102 via pads. The control unit 100 to be described below is connected to the drive unit 102 which outputs driving signals in accordance with a control signal output from the control unit 100. Driving signals, which are output from the drive unit 102 to drive the TFTs 20 to control the switching states thereof, flow to the plurality of scanning wiring lines 26, respectively. Additionally, the plurality of signal wiring lines 24 are respectively connected to the signal processing unit 104 via pads, respectively, and thereby, electrical charges read from the respective pixels 16 are output to the signal processing unit 104 as electrical signals. The signal processing unit 104 generates and outputs image data according to the input electrical signals.

The control unit 100 to be described below is connected to the signal processing unit 104, and the image data output from the signal processing unit 104 is sequentially output to the control unit 100. The image memory 106 is connected to the control unit 100, and the image data sequentially output from the signal processing unit 104 is sequentially stored in the image memory 106 under the control of the control unit 100. The image memory 106 has a storage capacity capable of storing image data equivalent to a predetermined number of sheets, and whenever radiographic images are captured, image data obtained by the capturing is sequentially stored in the image memory 106.

The control unit 100 comprises a central processing unit (CPU) 100A, a memory 100B including a read only memory (ROM), a random access memory (RAM), and the like, and a nonvolatile storage unit 100C, such as a flash memory. An example of the control unit 100 is a microcomputer or the like. The control unit 100 controls the overall operation of the radiographic imaging apparatus 1.

Additionally, common wiring lines 28 are provided in a wiring direction of the signal wiring lines 24 at the sensor parts 22 of the respective pixels 16 in order to apply bias voltages to the respective pixels 16. Bias voltages are applied to the respective pixels 16 from a bias power source by connecting the common wiring lines 28 to the bias power source (not illustrated) outside the sensor substrate 12 via pads.

The power source unit 108 supplies electrical power to various elements or various circuits, such as the control unit 100, the drive unit 102, the signal processing unit 104, the image memory 106, and the power source unit 108. In addition, in FIG. 1, illustration of wiring lines, which connect the power source unit 108 and various elements or various circuits together, is omitted in order to avoid complication.

Figure 2:
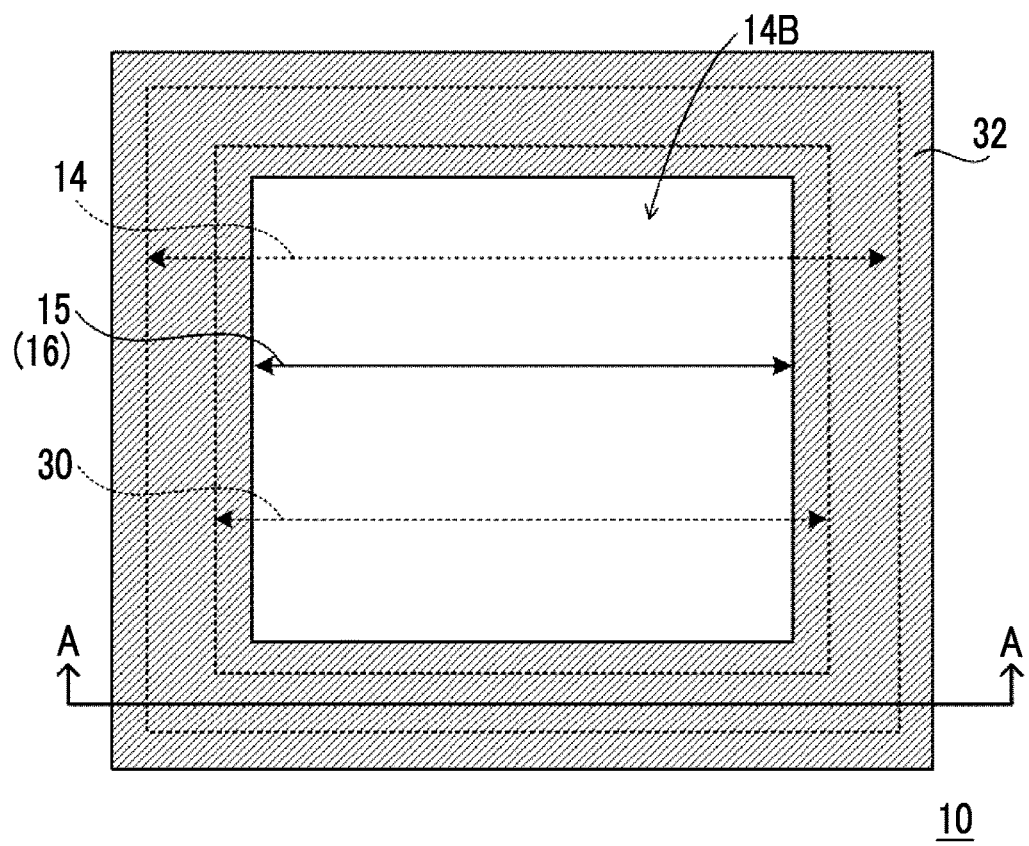
FIG. 2 is a plan view of the example of the radiation detector of the first embodiment as seen from a side opposite to a side where a conversion layer is provided.

Moreover, the radiation detector 10 of the present embodiment will be described in detail. FIG. 2 is a plan view of the radiation detector 10 of the present embodiment as seen from a second surface 14B opposite to the first surface 14A. Additionally, FIG. 3 is a cross-sectional view taken along line A-A of the radiation detector 10 in FIG. 2.

Figure 3:
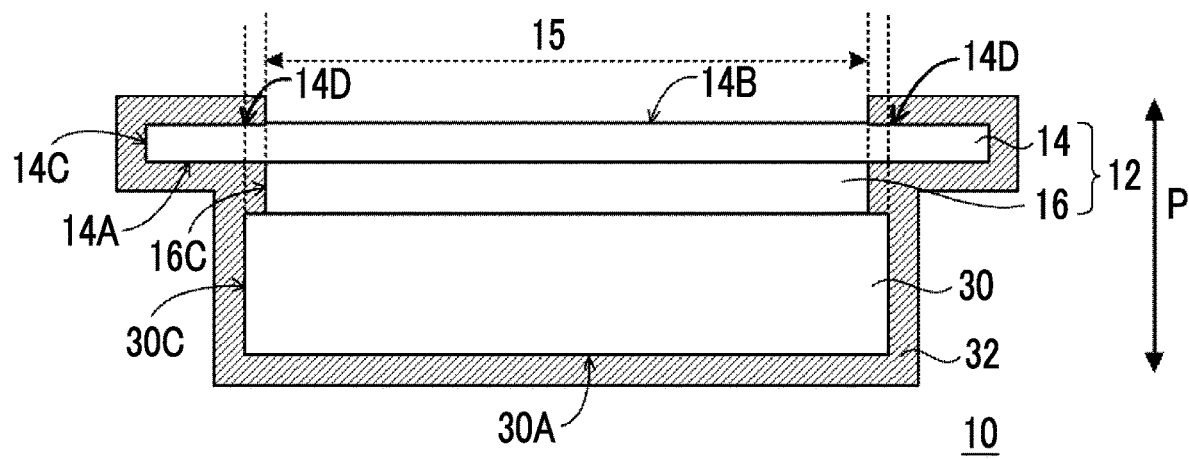
FIG. 3 is a cross-sectional view taken along line A-A of the radiation detector illustrated in FIG. 2.

As illustrated in FIGS. 2 and 3, the radiation detector 10 of the present embodiment comprises the sensor substrate 12 including the base material 14 and the pixels 16, a conversion layer 30, and a protective film 32, and the base material 14, the pixels 16, and the conversion layer 30 are provided in this order.

In addition, in the following, a direction (upward-downward direction in FIG. 3) in which the base material 14, the pixels 16, and the conversion layer 30 are arranged is referred to as a lamination direction (refer to a lamination direction P in FIG. 3). Additionally, for convenience of description, the conversion layer 30 side of the radiation detector 10 in the lamination direction P may be referred to as "up", and the sensor substrate 12 side may be referred to as "down."

The base material 14 is a resin sheet having flexibility and including, for example, plastics, such as polyimide. A specific example of the base material 14 is XENOMAX (registered trademark). In addition, the base material 14 may have any desired flexibility and is not limited to the resin sheet. For example, the base material 14 may be a relatively thin glass substrate. The thickness of the base material 14 may be a thickness such that desired flexibility is obtained in accordance with the hardness of a material, the size of the sensor substrate 12 (the area of the first surface 14A or the second surface 14B), or the like. As an example having flexibility, in the case of a single rectangular base material 14, in a state where one side of the base material 14 is fixed, the base material 14 hangs down 2 mm or more with the gravity resulting from its own weight at a position 10 cm away from the fixed side (become lower than the height of the fixed side). As a specific example in a case where the base material 14 is the resin sheet, the thickness thereof may be 5 µm to 125 µm. Additionally, as a specific example in a case where the base material 14 is the glass substrate, the base material 14 has flexibility in a case where the thickness thereof becomes 0.1 mm or less in a size in which one side is about 43 cm or less. Therefore, the thickness may be 0.1 mm or less. In addition, in a case where the resin sheet is used as the base material 14, a resin sheet capable of withstanding the heat applied to the base material 14 due to film formation or the like in the formation of the pixels 16 is used.

As illustrated in FIGS. 2 and 3, the plurality of pixels 16 are provided in an inner partial region on the first surface 14A of the base material 14. In other words, in the sensor substrate 12 of the present embodiment, no pixel 16 is provided at an outer peripheral part of the first surface 14A of the base material 14. In the present embodiment, the region on the first surface 14A of the base material 14 where the pixels 16 are provided is used as the active area 15. The active area 15 of the present embodiment is an example of the pixel region of the present disclosure. In addition, in the present embodiment, as an example, the pixels 16 are provided on the first surface 14A of the base material 14 via an undercoat layer (not illustrated) using SiN or the like.

Additionally, as illustrated in FIG. 3, the conversion layer 30 covers the active area 15. The conversion layer 30 of the present embodiment covers a range wider than the active area 15, including the entire active area 15, as an example.

In the present embodiment, a scintillator including CsI (cesium iodide) is used as an example of the conversion layer 30. It is preferable that such a scintillator includes, for example, CsI:Tl (cesium iodide to which thallium is added) or CsI:Na (cesium iodide to which sodium is added) having an emission spectrum of 400 nm to 700 nm at the time of X-ray radiation. In addition, the emission peak wavelength in a visible light region of CsI:Tl is 565 nm.

In the radiation detector 10 of the present embodiment, as an example, the conversion layer 30 of CsI is directly formed as a columnar crystal on the sensor substrate 12 by a vapor deposition method, such as a vacuum vapor deposition method, a sputtering method, and a chemical vapor deposition (CVD) method. As a method of forming the conversion layer 30 includes, for example, in a case where CsI:Tl is used as the conversion layer 30, there is a vacuum vapor deposition method in which CsI:Tl with heating means, such as a resistance heating-type crucible, is heated and gasified in an environment with the vacuum degree of 0.01 Pa to 10 Pa, and CsI:Tl is deposited on the sensor substrate 12 with the temperature of the sensor substrate 12 as the room temperature (20°) to 300° C. As the thickness of the conversion layer 30, 100 μm to 800 μm is preferable.

In addition, in the present embodiment, an end part of a columnar crystal of the conversion layer 30 on a base point side (a sensor substrate 12 side in the present embodiment) in a growth direction is referred to as a "root", and a sharpened end part opposite to the root in the growth direction is referred to as a "tip".

In addition, in this way, in a case where the conversion layer of CsI is directly formed on the sensor substrate 12 by the vapor deposition method, for example, a reflective layer (not illustrated) having a function of reflecting the light converted in the conversion layer 30 may be provided on the surface of the conversion layer opposite to the side in contact with the sensor substrate 12. The reflective layer may be directly provided in the conversion layer 30, and or may be provided via an adhesion layer or the like. As a material of the reflective layer in this case, it is preferable to use an organic material, and it is preferable to use, for example, at least one of white polyethylene terephthalate (PET), $TiO_2$, $Al_2O_3$, foamed white PET, a polyester-based high-reflection sheet, specular reflection aluminum, or the like. Particularly, it is preferable to use the white PET as the material from a viewpoint of reflectivity.

In addition, the white PET is obtained by adding a white pigment, such as $TiO_2$ or barium sulfate, to PET. Additionally, the polyester-based high-reflection sheet is a sheet (film) having a multilayer structure in which a plurality of thin polyester sheets are laminated. Additionally, the foamed white PET is white PET of which the surface is porous.

Additionally, in a case where the scintillator of CsI is used as the conversion layer 30, the conversion layer 30 can also be formed in the sensor substrate 12 by a method different from the method of the present embodiment. For example, the conversion layer 30 may be formed in the sensor substrate 12 by preparing CsI vapor-deposited on an aluminum sheet or the like by the vapor deposition method, and bonding the side of CsI, which is not in contact with the aluminum sheet, and the pixels 16 of the sensor substrate 12 together with an adhesive sheet or the like.

Moreover, unlike the radiation detector 10 of the present embodiment, GOS ($Gd_2O_2S$:Tb) or the like may be used as the conversion layer 30 instead of CsI. In this case, for example, a sheet bonded to a support formed of the white PET or the like with an adhesion layer or the like is prepared as a sheet in which GOS is dispersed in a binder, such as resin. The conversion layer 30 can be formed in the sensor substrate 12 by bonding the side of GOS on which the support is not bonded, and the pixels 16 of the sensor substrate 12 together with an adhesive sheet or the like. In addition, the efficiency of conversion from radiation to visible light in a case where CsI is used for the conversion layer 30 becomes higher than that in a case where GOS is used.

Additionally, in the radiation detector 10 of the present embodiment, as illustrated in FIGS. 2 and 3, the protective film 32 covers a portion ranging from a surface 30A (lower surface 30A) opposite to the side of the conversion layer 30 where the sensor substrate 12 is provided to a position, corresponding to the end part of the conversion layer 30, on the second surface 14B opposite to the first surface 14A of the base material 14. The opposite surface 30A of the present embodiment is an example of an opposite surface of the present disclosure.

Specifically, as illustrated in FIG. 3, the protective film 32 covers a region ranging from end parts on the lower surface 30A and a side surface 30C of the conversion layer 30, side surfaces 16C of the pixels 16, a side surface 14C of the base material 14, and the second surface 14B of the base material 14 to the active area 15. In this way, the protective film 32 of the present embodiment covers a position 14D, corresponding to the position of the end part of the conversion layer 30, on the second surface 14B of the base material 14. The position 14D of the present embodiment is an example of a corresponding position of the present disclosure. In addition, a specific region where the protective film 32 covers the second surface 14B preferably does not cover the active area 15, and is not particularly limited as long as the active area 15 is not covered and the position 14D is covered. In other words, an end part of the protective film 32 may be located at any position between the position 14D and the boundary of the active area 15.

As the protective film 32, for example, a moisture resistance film, such as a PARYLENE (registered trademark) film, or an insulating sheet, such as polyethylene terephthalate, is used.

As in the radiation detector 10 illustrated in FIGS. 2 and 3, a method of manufacturing the radiation detector 10 comprising the sensor substrate 12 using the flexible base material 14 will be described with reference to FIG. 4.

Figure 4:
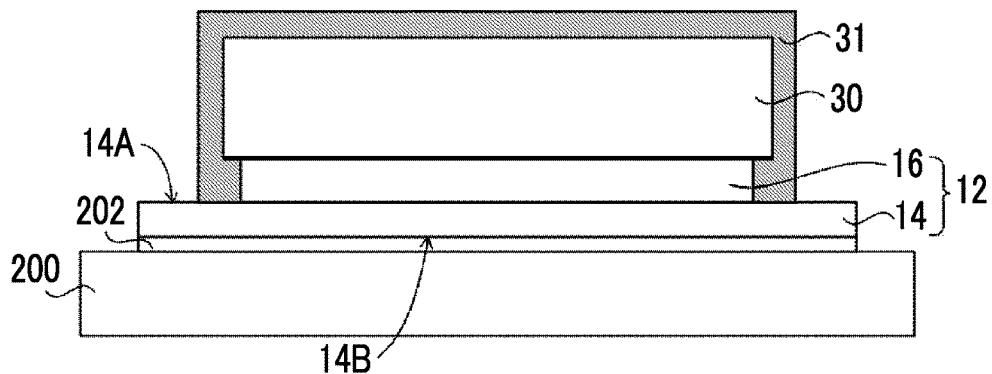
FIG. 4 is an explanatory view illustrating a method for manufacturing the radiation detector illustrated in FIGS. 2 and 3.

In the radiation detector 10 of the present embodiment, as in the example illustrated in FIG. 4, the sensor substrate 12 is formed on a support 200, such as a glass substrate having thickness larger than that of the base material 14, via a peeling layer 202, for example by a lamination method or the like. In addition, in a case where the sensor substrate 12 is formed by the lamination method, a sheet to be the base material 14 is bonded on the peeling layer 202. In this case, the second surface 14B of the base material 14 is brought into contact with the peeling layer 202.

Moreover, the pixels 16 are formed on the first surface 14A of the base material 14. In addition, in the present embodiment, as an example, the pixels 16 are formed on the first surface 14A of the base material 14 via an undercoat layer (not illustrated) using SiN or the like.

Moreover, the conversion layer 30 is formed on the pixels 16. In the present embodiment, the conversion layer 30 of CsI is directly formed as a columnar crystal on the sensor substrate 12 by a vapor deposition method, such as a vacuum vapor deposition method. In this case, the side of the conversion layer 30, which is in contact with the pixels 16, becomes a base point side in a growth direction of the columnar crystal.

Moreover, in the radiation detector 10 of the present embodiment, the state illustrated in FIG. 4 is brought about by forming a temporary protective film 31 on the entire conversion layer 30, specifically, the entire surface of the conversion layer 30 that is not in contact with the pixels 16, and a region extending over the first surface 14A of the base material 14, by bonding or the like, in the sensor substrate 12 in which the conversion layer 30 is provided. In addition, as the temporary protective film 31, for example, a PARYLENE (registered trademark) film, an insulating sheet, such as polyethylene terephthalate, or the like is used similarly to the protective film 32 or the like.

Thereafter, the sensor substrate 12 provided with the conversion layer 30 and the temporary protective film 31 is peeled from the support 200 by the peeling layer 202. The peeling method is not particularly limited. For example, in mechanical peeling, peeling of the sensor substrate 12 is performed by using any of the four sides of the sensor substrate 12 (base material 14) as a starting point for peeling and gradually peeling the sensor substrate 12 from the support 200 toward an opposite side from the side to be the starting point. Additionally, for example, in a laser peeling (laser lift-off) method, the sensor substrate 12 may be peeled from the support 200 by radiating a laser beam from a back surface (for a surface opposite to the surface on which the sensor substrate 12 is provided) of the support 200 and by decomposing the peeling layer 202 with the laser beam transmitted through the support 200.

In the present embodiment, the radiation detector 10 of the present embodiment illustrated in FIGS. 2 and 3 is manufactured by forming the protective film 32 after the sensor substrate 12 is peeled from the support 200 and then the temporary protective film 31 is further peeled from the sensor substrate 12. As a method of forming the protective film 32, for example, a parylene film may be formed by vapor deposition. Additionally, as described with reference to in FIG. 3, a region ranging from the end parts on the lower surface 30A and a side surface 30C of the conversion layer 30, side surfaces 16C of the pixels 16, a side surface 14C of the base material 14, and the second surface 14B of the base material 14 to the active area 15 may be covered with, for example, a sheet-like protective film. In addition, in a case where the sheet-like protective film is used, the above entire region to be covered with the protective film 32 may be covered with one sheet. Additionally, the above region to be covered with the protective film 32 may be covered, for example, by sandwiching the sensor substrate 12 and the conversion layer 30 (base material 14) with a plurality of sheets, such as sandwiching the sensor substrate 12 and the conversion layer 30 (base material 14) with the sheets from the first surface 14A side and the second surface 14B side, respectively.

Next, the radiographic imaging apparatus 1 to which the radiation detector 10 of the present embodiment is applied will be described. The radiographic imaging apparatus 1 of the present embodiment is provided within a housing through which radiation is transmitted and which has waterproofness, antibacterial properties, and sealability.

Figure 5:
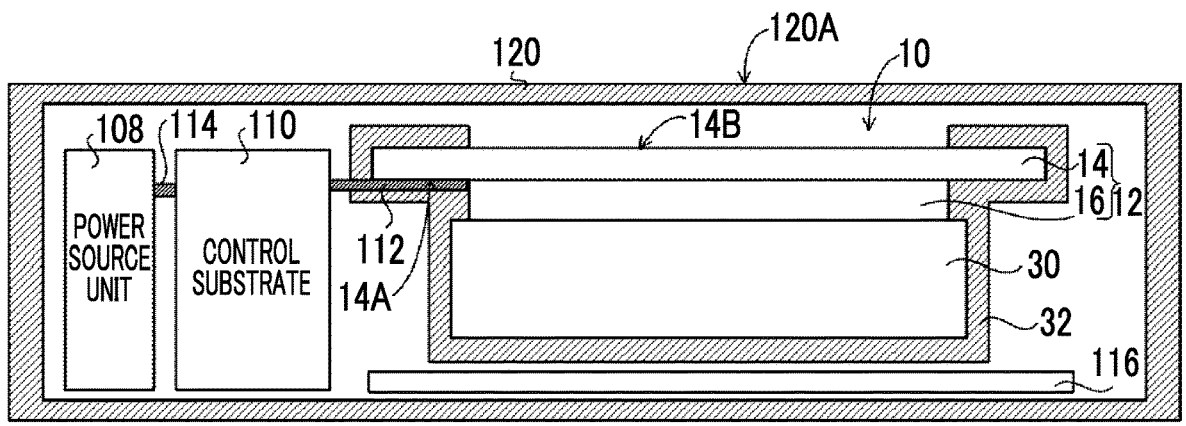
FIG. 5 is a cross-sectional view illustrating an example of a state where the radiation detector is provided within a housing in a case where the radiographic imaging apparatus of the present embodiment is applied to a surface reading type.

FIG. 5 is a cross-sectional view illustrating an example of a state where the radiation detector 10 is provided within a housing 120 in a case where the radiographic imaging apparatus 1 of the present embodiment is applied to an irradiation side sampling (ISS) type.

As illustrated in FIG. 5, the radiation detector 10, the power source unit 108, and a control substrate 110 are provided side by side in a direction intersecting the lamination direction P (refer to FIG. 3) within the housing 120. The radiation detector 10 is provided in a state where the second surface 14B of the base material 14 faces an imaging surface 120A side of the housing 120 that is irradiated with radiation transmitted through a subject.

The control substrate 110 is a substrate in which the image memory 106, the control unit 100, and the like are formed, and is electrically connected to the pixels 16 of the sensor substrate 12 by a flexible cable 112 including a plurality of signal wiring lines. In addition, in the present embodiment, the control substrate 110 is a so-called chip on film (COF) in which the drive unit 102 and the signal processing unit 104 are provided on the cable 112. However, at least one of the drive unit 102 or the signal processing unit 104 may be formed in the control substrate 110.

Additionally, the control substrate 110 and the power source unit 108 are connected together via a power source line 114.

A sheet 116 is further provided on a side to which the radiation transmitted through the radiation detector 10 is emitted, within the housing 120 of the radiographic imaging apparatus 1 of the present embodiment. The sheet 116 is, for example, a copper sheet. The copper sheet does not easily generate secondary radiation due to incident radiation, and therefore, has a function of preventing scattering to the rear side, that is, the conversion layer 30. In addition, the sheet 116 covers at least an entire surface of the conversion layer 30 from which radiation is emitted, it is preferable that the sheet 116 covers the entire conversion layer 30, and it is more preferable that the sheet 116 covers the entire protective film 32. In addition, the thickness of the sheet 116 may be selected in accordance with the flexibility, weight, and the like of the entire radiographic imaging apparatus 1. For example, in a case where the sheet 116 is the copper sheet and in a case where the thickness of the sheet is about 0.1 mm or more, the sheet 116 also has a function of having flexibility and shielding secondary radiation that has entered the inside of the radiographic imaging apparatus 1 from the outside. Additionally, for example, in a case where the sheet 116 is the copper sheet, it is preferable that the thickness is 0.3 mm or less from a viewpoint of flexibility and weight.

The radiographic imaging apparatus 1 illustrated in FIG. 5 is able to capture a radiographic image in a state where the radiation detector 10 is deflected in an out-plane direction of the second surface 14B of the base material 14. For example, it is possible to maintain the radiation detector 10 in a deflected state in accordance with a capturing site or the like of a subject, and capture a radiographic image.

In the radiographic imaging apparatus 1 illustrated in FIG. 5, since the power source unit 108 and the control substrate 110 are provided at a peripheral part of the housing 120 having a relatively high stiffness, the influence of external forces to be given to the power source unit 108 and the control substrate 110 can be suppressed.

In addition, although FIG. 5 illustrates a form in which both the power source unit 108 and the control substrate 110 are provided on one side of the radiation detector 10, specifically, on one side of a rectangular radiation detector 10, a position where the power source unit 108 and the control substrate 110 are provided is not limited to the form illustrated in FIG. 5. For example, the power source unit 108 and the control substrate 110 may be provided so as to be respectively decentralized onto two facing sides of the radiation detector 10, or may be provided so as to be respectively decentralized onto two adjacent sides. Additionally, in the present embodiment, FIG. 5 illustrates a form in which the power source unit 108 and the control substrate 110 are one component part (substrate). However, the invention is not limited to the form illustrated in FIG. 5. A form in which at least one of the power source unit 108 or the control substrate 110 is a plurality of component parts (substrates) may be adopted. For example, a form in which the power source unit 108 includes a first power source unit and a second power source unit (all are not illustrated) may be adopted, or the first power source unit and the second power source unit may be provided so as to be decentralized onto two facing sides of the radiation detector 10.

In addition, in a case where the entire radiographic imaging apparatus 1 (radiation detector 10) is deflected and a radiographic image is captured, the influence on the image resulting from the deflection be suppressed by performing image correction.

Figure 6:
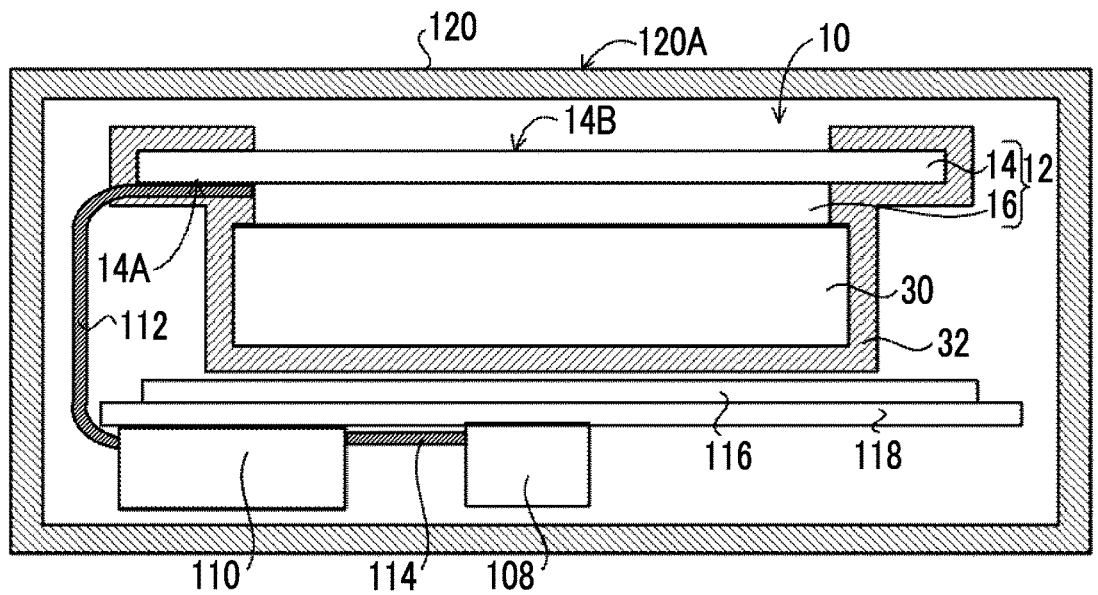
FIG. 6 is a cross-sectional view illustrating another example in the state where the radiation detector is provided within the housing in the case where the radiographic imaging apparatus of the present embodiment is applied to the surface reading type.

FIG. 6 is a cross-sectional view illustrating another example in a state where the radiation detector 10 is provided within the housing 120 in a case where the radiographic imaging apparatus 1 of the present embodiment is applied to the ISS type.

As illustrated in FIG. 6, the power source unit 108 and the control substrate 110 are provided side by side in the direction intersecting the lamination direction P (refer to FIG. 3) within the housing 120, and the radiation detector 10, the power source unit 108, and the control substrate 110 are provided side by side in the lamination direction P (refer to FIG. 3).

Additionally, in the radiographic imaging apparatus 1 illustrated in FIG. 6, a base 118 that supports the radiation detector 10 and the control substrate 110 is provided between the control substrate 110 and the power source unit 108, and the sheet 116. For example, carbon or the like is used for the base 118.

In the radiographic imaging apparatus 1 illustrated in FIG. 6, it is possible to capture a radiographic image in a state where the radiation detector 10 is slightly deflected in the out-plane direction of the second surface 14B of the base material 14, for example, in a state where a central part thereof is deflected by about 1 mm to 5 mm. However, since the control substrate 110 and the power source unit 108, and the radiation detector 10 are provided in the lamination direction and the base 118 is provided, the central part is not deflected unlike the case of the radiographic imaging apparatus 1 illustrated in FIG. 5.

Figure 7:
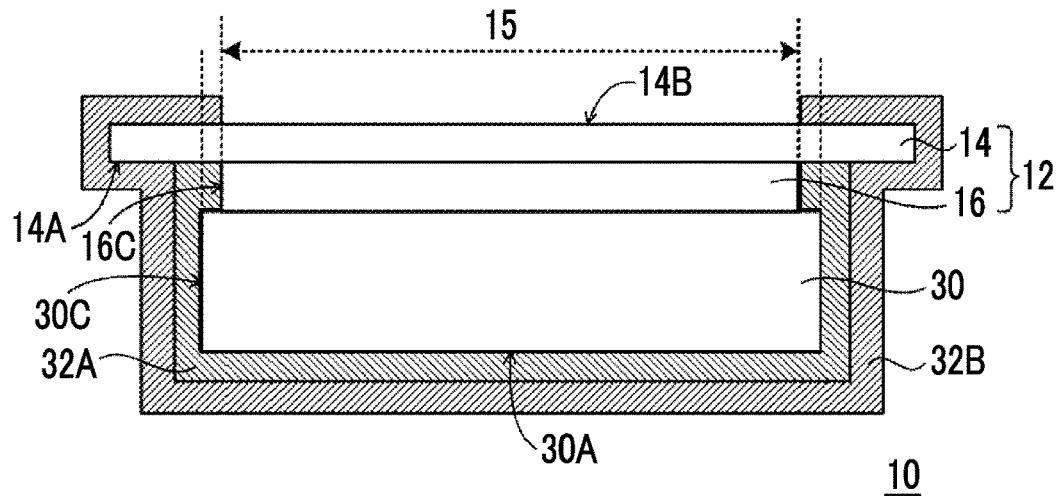
FIG. 7 is a cross-sectional view of another example of the radiation detector of the first embodiment.

In addition, in the radiation detector 10 illustrated in FIGS. 2 and 3, a form in which the protective film 32 is a single film has been described. However, the protective film 32 may include a plurality of protective films. An example of the configuration of the radiation detector 10 in this case is illustrated in FIG. 7. The radiation detector 10 illustrated as an example in FIG. 7 comprises a first protective film 32A and a second protective film 32B instead of the above protective film 32. As illustrated in FIG. 7, the first protective film 32A covers the lower surface 30A and the side surfaces 30C of the conversion layer 30, and the side surfaces 16C of the pixels 16. As the first protective film 32A, for example, a parylene film, a polyethylene sheet having flexibility, a film, such as soft vinyl chloride, or the like can be applied. On the other hand, the second protective film 32B covers a region ranging from the end part on the second surface 14B of the base material 14 to the active area 15, including the entire first protective film 32A. In other words, although the second protective film 32B covers the same region as the protective film 32, the second protective film 32B is different from the protective film 32 in that the second protective film 32B covers the entire first protective film 32A. As the second protective film 32B, for example, an ALPET (registered trademark) sheet obtained by laminating aluminum, such as bonding aluminum foil, on the insulating sheet (film), such as polyethylene terephthalate, a film using an antistatic coating material "COLCOAT" (trade name: made by COLCOAT CO., LTD), PET, polypropylene, and the like are applicable.

Figure 8:
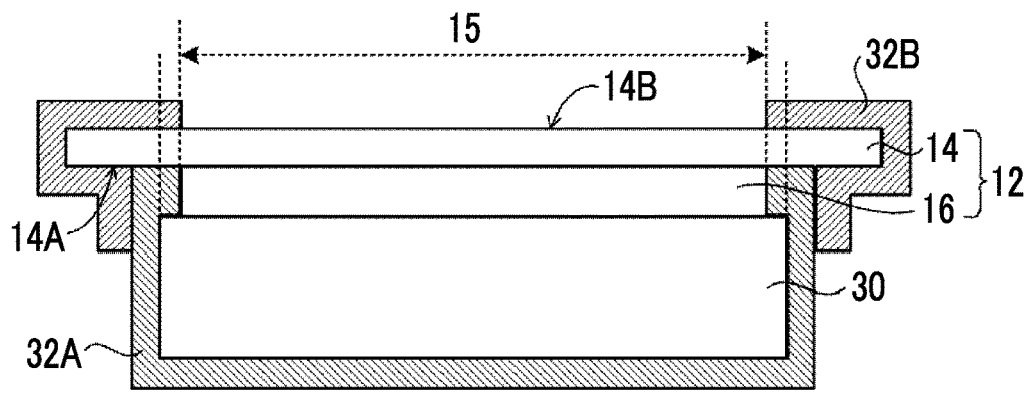
FIG. 8 is a cross-sectional view of still another example of the radiation detector of the first embodiment.

Additionally, still another example of the configuration of the radiation detector 10 in a case where the protective film 32 includes the plurality of protective films is illustrated in FIG. 8. The radiation detector 10 illustrated as an example in FIG. 8 also comprises the first protective film 32A and the second protective film 32B instead of the above protective film 32. The first protective film 32A has the same configuration as the first protective film 32A in the radiation detector 10 described with reference to above FIG. 7. On the other hand, as illustrated in FIG. 8, the second protective film 32B covers a region ranging from a region including the end part of the first protective film 32A to the active area 15 on the second surface 14B of the base material 14. In other words, the second protective film 32B covers a region ranging from the active area 15 of the second surface 14B to a region overlapping the end part of the first protective film 32A, with the side surface 14C of the base material 14 sandwiched therebetween. In addition, in this case, the first protective film 32A and the second protective film 32B are bonded and fixed with an adhesive or the like.

In this way, in the radiation detector 10 of the present embodiment, the protective film 32 (the first protective film 32A and the second protective film 32B in FIGS. 7 and 8) covers the region ranging from end parts on the lower surface 30A and the side surface 30C of the conversion layer 30, the side surfaces 16C of the pixels 16, the side surface 14C of the base material 14, and the second surface 14B of the base material 14 to the active area 15. Accordingly, the protective film 32 covers up to a position 14D, corresponding to the position of the end part of the conversion layer 30, on the second surface 14B of the base material 14.

Since the flexible base material 14 used for the sensor substrate 12 has a lower stiffness compared to a base material made of glass, the flexible base material 14 is easily deflected. Additionally, In a case where the sensor substrate 12 is deflected, there is a case where the entire base material 14 is not integrally deflected, but is partially or locally deflected or distorted, or its deflection direction differs for each position within the surfaces (the first surface 14A and the second surface 14B) of the base material 14. The deflection or distortion that occurs in such a case is referred to as the "discontinuous deflection" in the present embodiment with respect to a case where the entire base material is integrally deflected. Additionally, since this discontinuous deflection tends to occur relatively easily in the vicinity of the end part of the conversion layer 30 in the sensor substrate 12 because the total thickness or the like of the sensor substrate 12 varies particularly in the vicinity of the end part of the conversion layer 30.

In the radiation detector 10 of the present embodiment, as described above, the protective film 32 wraps around the side surface 14C from the first surface 14A side of the base material 14 and covers the portion up to the position 14D, corresponding to the position of the end part of the conversion layer 30, on the second surface 14B of the base material 14. Accordingly, the protective film 32 complements the stiffness of the sensor substrate 12 in the vicinity of the end part of the conversion layer 30.

Accordingly, according to the radiation detector 10 of the present embodiment, the discontinuous deflection does not easily occur in the sensor substrate 12 (the base material 14).

Additionally, the radiation detector 10 of the present embodiment can enhance the moisture resistance effect in the end part region of the base material 14 because the end part of the base material 14 is sandwiched and covered with the protective film 32 (the second protective film 32B in FIGS. 7 and 8).

Second Embodiment

Next, a second embodiment will be described. In addition, since the radiation detector 10 of the present embodiment includes the same configuration as the radiation detector 10 (refer to FIGS. 1 to 3) of the first embodiment, a detailed description of the same components will be omitted.

Figure 9:
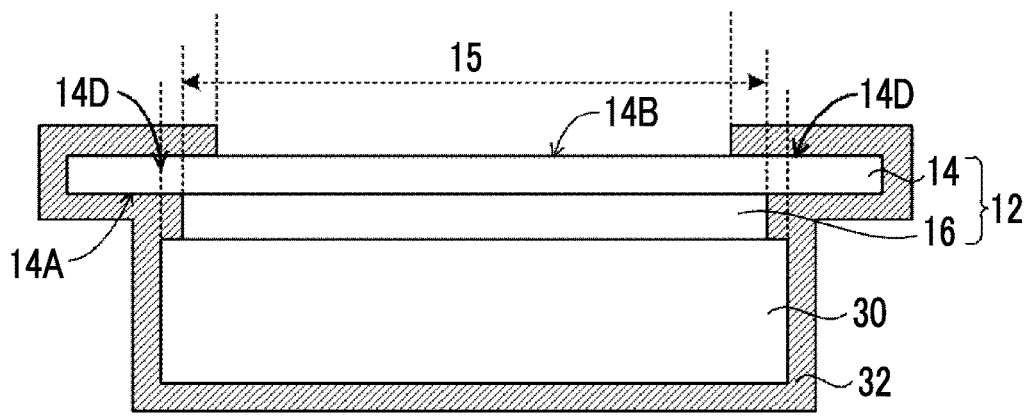
FIG. 9 is a cross-sectional view of an example of a radiation detector of a second embodiment.

A cross-sectional view of an example of the radiation detector 10 of the present embodiment is illustrated in FIG. 9. As illustrated in FIG. 9, the protective film 32 of the radiation detector 10 of the present embodiment is different from the radiation detector 10 of the first embodiment in that the protective film 32 covers up to a portion of the active area 15 on the second surface 14B of the base material 14 in the sensor substrate 12.

Also in the radiation detector 10 illustrated in FIG. 9, similarly to the radiation detector 10 (refer to FIG. 3) of the first embodiment, the protective film 32 covers up to the position 14D, corresponding to the position of the end part of the conversion layer 30, on the second surface 14B of the base material 14 by covering the region ranging from end parts on the lower surface 30A and the side surface 30C of the conversion layer 30, the side surfaces 16C of the pixels 16, the side surface 14C of the base material 14, and the second surface 14B of the base material 14 to a portion of the active area 15.

Therefore, according to the radiation detector 10 of the present embodiment, the discontinuous deflection does not easily occur in the sensor substrate 12 (the base material 14).

Figure 10:
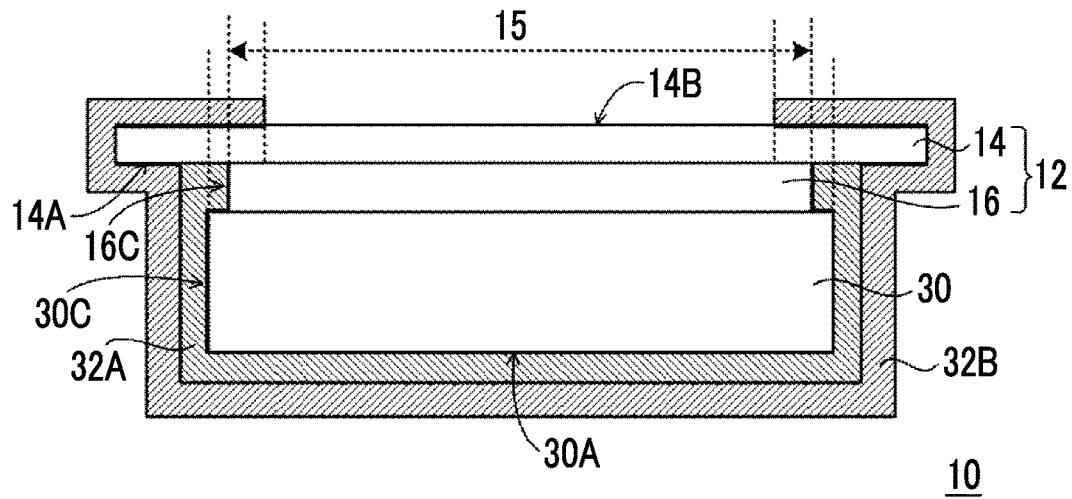
FIG. 10 is a cross-sectional view of another example of the radiation detector of the second embodiment.
Figure 11:
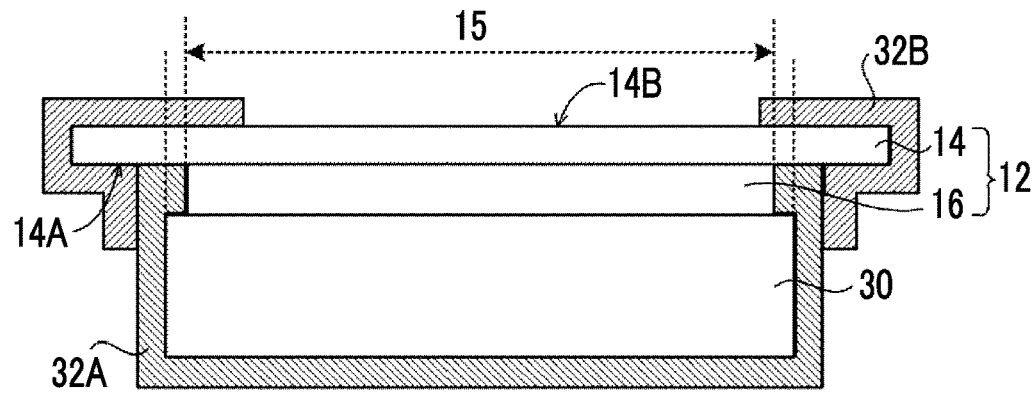
FIG. 11 is a cross-sectional view of still another example of the radiation detector of the second embodiment.

In addition, also in the present embodiment, the protective film 32 may include the plurality of protective films similarly to the first embodiment. For example, as in the radiation detector 10 illustrated in FIG. 10, similarly to the radiation detector 10 of the first embodiment illustrated in FIG. 7, the protective film 32 may comprise the first protective film 32A that covers the lower surface 30A and the side surface 30C of the conversion layer 30 and the side surfaces 16C of the pixels 16, and the second protective film 32B that covers a region ranging from the end part on the second surface 14B of the base material 14 to a partial region within of the active area 15, including the entire first protective film 32A. For example, as in the radiation detector 11 illustrated in FIG. 10, similarly to the radiation detector 10 of the first embodiment illustrated in FIG. 8, the protective film 32 may comprise the above first protective film 32A, and the second protective film 32B that covers a region ranging from a region including the end part of the first protective film 32A to a partial region within of the active area 15 on the second surface 14B of the base material 14.

Third Embodiment

Next, a third embodiment will be described. In addition, since the radiation detector 10 of the present embodiment includes the same configuration as the radiation detector 10 (refer to FIGS. 1 to 3) of the first embodiment, a detailed description of the same components will be omitted.

Figure 12:
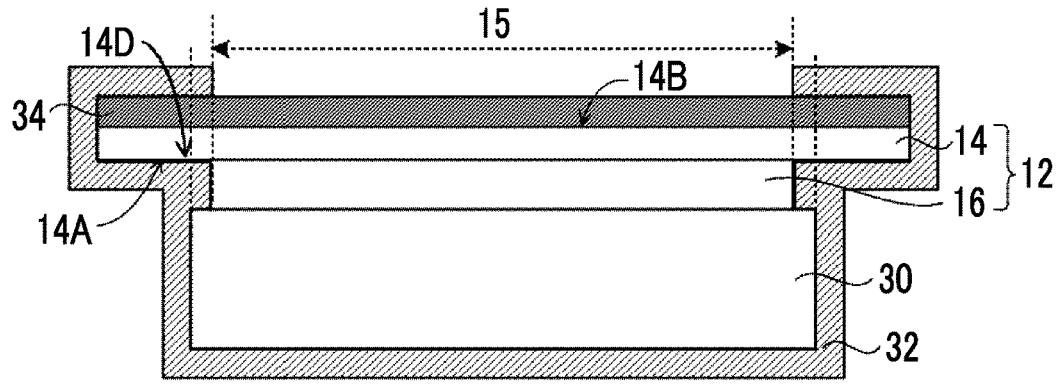
FIG. 12 is a cross-sectional view of an example of a radiation detector of a third embodiment.

A cross-sectional view of an example of the radiation detector 10 of the present embodiment is illustrated in FIG. 12. As illustrated in FIG. 12, the radiation detector 10 of the present embodiment is different from the radiation detector 10 of the first embodiment in that the radiation detector 10 further comprises a third protective film 34 in addition to the protective film 32. As illustrated in FIG. 12, the third protective film 34 is provided on the second surface 14B side of the base material 14 to cover the entire second surface 14B, and covers the region on the second surface 14B that is not covered with the protective film 32. Additionally, the protective film 32 covers the region of the third protective film 34 that corresponds to a region ranging from an end part of the third protective film 34 to the active area 15.

That is, in the radiation detector 10 illustrated in FIG. 12, the entire radiation detector 10 is covered with at least one of the protective film 32 or the third protective film 34.

Such third protective film 34 may be a film having at least one of an antistatic function or a moisture resistance function, and includes, for example, an ALPET sheet, a parylene film, or the like. In a case where the third protective film 34 is the ALPET sheet, the third protective film 34 can be formed by bonding or the like. On the other hand, in a case where the third protective film 34 is the parylene film, the third protective film 34 can be formed by vapor deposition.

In the radiation detector 10 of the present embodiment, the effect of suppressing entering of moisture from the outside can be further enhanced by providing the third protective film 34. Therefore, the degradation of the moisture resistance performance can be suppressed.

In addition, in the radiation detector 10 illustrated in FIG. 12, a form in which the third protective film 34 is provided in the radiation detector 10 of the first embodiment illustrated in the above FIG. 3 is shown as an example. However, for example, also in the radiation detectors 10 illustrated in the other FIGS. 7 to 11, the third protective film 34 may be similarly provided on the second surface 14B of the base material 14.

Fourth Embodiment

Next, a fourth embodiment will be described. In addition, since the radiation detector 10 of the present embodiment includes the same configuration as the radiation detector 10 (refer to FIGS. 1 to 3) of the first embodiment, a detailed description of the same components will be omitted.

Figure 13:
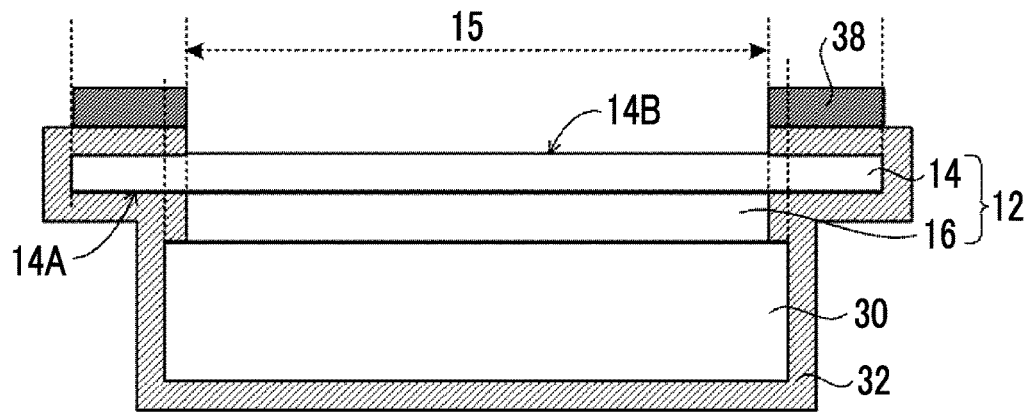
FIG. 13 is a cross-sectional view of an example of a radiation detector of a fourth embodiment.

A cross-sectional view of an example of the radiation detector 10 of the present embodiment is illustrated in FIG. 13. As illustrated in FIG. 13, the radiation detector 10 of the present embodiment is different from the radiation detector 10 of the first embodiment in that the radiation detector 10 comprises a supporting member 38. As illustrated in FIG. 13, the supporting member 38 supports the base material 14 via the protective film 32 from the second surface 14B side of the base material 14. That is, the supporting member 38 so-called backs up the base material 14 via the protective film 32. The supporting member 38 is fixed to the protective film 32, for example, with an adhesive, such as double-stick tape or glue.

The supporting member 38 of the present embodiment has stiffness, and its stiffness at least in an in-plane direction of the second surface 14B is higher than that of the base material 14 and the protective film 32. The supporting member 38, is plastics, such as polyethylene terephthalate (PET), an aluminum sheet, or the like, which has a size with which a desired stiffness is obtained. In addition, since the supporting member 38 of the present embodiment is provided outside the region corresponding to the active area 15 of the second surface 14B, the transmittance and absorbance of radiation in the supporting member 38 do not have large influence on capturing of a radiographic image. In addition, as the thickness of the supporting member 38 in the lamination direction P is thicker, a distance from a subject to the pixels 16 becomes longer. Therefore, defocusing occurs in a captured radiographic image. For that reason, it is preferable to set the thickness of the supporting member 38 in accordance with a desired stiffness and desired image quality.

In the radiation detector 10 of the present embodiment, the occurrence of the discontinuous deflection in the sensor substrate 12 (base material 14) can be suppressed by providing the supporting member 38. Accordingly, the peeling of the conversion layer 30 from the sensor substrate 12 due to the influence of the discontinuous deflection can be further suppressed.

Generally, in a case where the conversion layer 30 is peeled or deteriorates due to moisture or the like, deterioration of the quality of a radiographic image to be generated is caused. In contrast, in the radiation detector 10 of the present embodiment, the peeling of the conversion layer 30 is suppressed and the degradation of moisture resistance is suppressed. Therefore, the deterioration of the image quality of a generated radiographic image can be suppressed.

In addition, in the radiation detector 10 illustrated in FIG. 13, a form in which the supporting member 38 is provided in the radiation detector 10 of the first embodiment illustrated in the above FIG. 3 is shown as an example. However, for example, also in the radiation detectors 10 illustrated in the other FIGS. 7 and 8, the supporting member 38 that supports the base material 14 via the protective film 32 from the second surface 14B of the base material 14 may be similarly provided.

Figure 14:
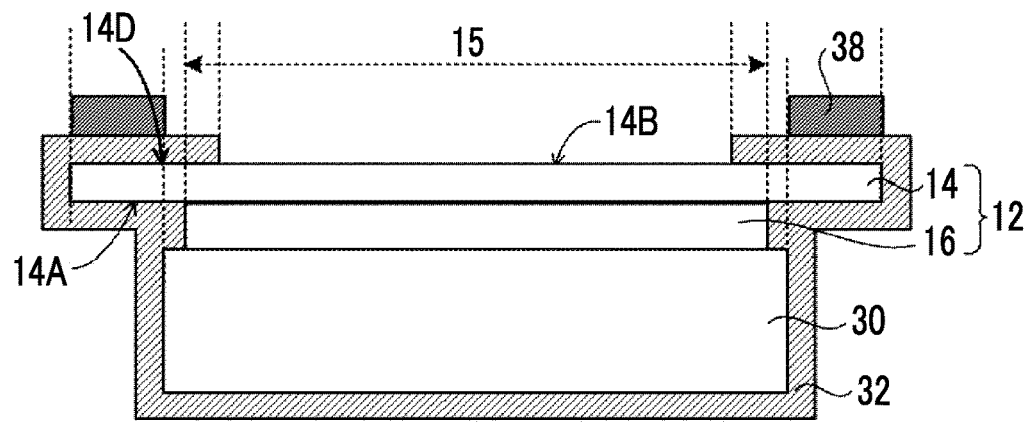
FIG. 14 is a cross-sectional view of another example of the radiation detector of the fourth embodiment.

Moreover, for example, also in the radiation detectors 10 (radiation detectors 10 illustrated in FIGS. 9 to 11) of the second embodiment, the supporting member 38 that supports the base material 14 via the protective film 32 from the second surface 14B of the base material 14 may be similarly provided. A cross-sectional view of an example of the radiation detector 10 in this case is illustrated in FIG. 14. As illustrated in FIG. 14, the protective film 32 covers up to the inside of the active area 15 on the second surface 14B of the base material 14. However, the supporting member 38 supports the region ranging from the end part on the second surface 14B of the base material 14 to the position 14D corresponding to the position of the end part of the conversion layer 30. In addition, the region of the base material 14 supported by the supporting member 38 may be a region that is directed from the end part of the base material 14 to the inside thereof and excludes the region corresponding to the active area 15, and is preferably a region ranging from a region over the above position 14D to the active area 15.

As described above, the radiation detector 10 of each of the above embodiments comprises the sensor substrate 12 including the flexible base material 14, and a layer which is provided on the first surface 14A of the base material 14 and in which the plurality of pixels 16, which accumulate electrical charges generated in accordance with light converted from radiation, are formed; the conversion layer 30 that is provided on the first surface 14A side of the sensor substrate 12 to convert radiation into light; and the protective film 32 that covers the portion ranging from the surface of the conversion layer 30 opposite to the side where the sensor substrate 12 is provided, to the position 14D, corresponding to the end part of the conversion layer 30, on the second surface 14B opposite to the first surface 14A of the base material 14.

According to the radiation detector 10 of each of the above embodiments, the protective film 32 covers the portion ranging from the conversion layer 30 side to the position 14D, corresponding to the position of the end part of the conversion layer 30, on the second surface 14B of the base material 14. Therefore, according to the radiation detector 10 of each of the above embodiments, the stiffness of the base material 14 can be complemented by the protective film 32. Therefore, even in a case where the flexible base material 14 is used for the sensor substrate 12, the influence of the discontinuous deflection can be suppressed.

In this way, according to the radiation detector 10 of each of the above embodiments, the influence of the discontinuous deflection is suppressed. Therefore, the peeling of the conversion layer 30 from the sensor substrate 12 can be suppressed. Additionally, and disconnection of the signal wiring lines 24 or the like within the sensor substrate 12 can be suppressed. Moreover, the deterioration resulting from moisture or the like can be suppressed. Therefore, according to the radiation detector 10 of each the above embodiments, the deterioration of the image quality of the radiographic image to be generated can be suppressed.

In addition, it goes without saying that the configurations, manufacturing methods, and the like of the radiographic imaging apparatuses 1, the radiation detectors 10, and the like that are described in the respective above embodiments are merely examples, and can be modified in accordance with situations without departing from the scope of the invention.

Figure 15:
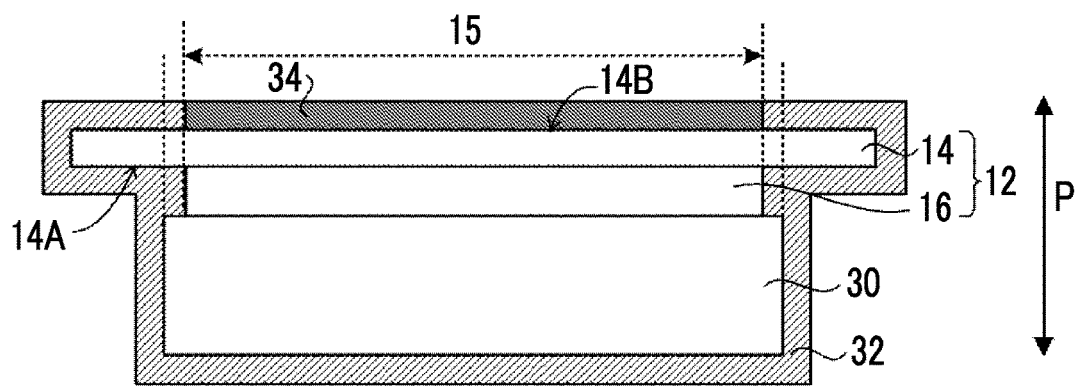
FIG. 15 is a cross-sectional view of a still further example of the radiation detector of the embodiment.

For example, as in the radiation detector 10 illustrated in FIG. 15, the third protective film 34 may have a form in which the third protective film 34 covers a region, which is not covered with the protective film 32, on the second surface 14B of the base material 14 in the sensor substrate 12. In addition, in this case, as illustrated in FIG. 15, it is preferable that the thickness of the protective film 32 in the lamination direction P and the thickness of the third protective film 34 are the same. That is, it is preferable to uniformize the height of the surface of the radiation detector 10 on which the conversion layer 30 is not provided. By arranging the height in this way, in a case where the radiation detector 10 is housed within the housing 120 to form the radiographic imaging apparatus 1, adhesion to the surface (top plate) of the housing 120 can be improved.

Figure 16:
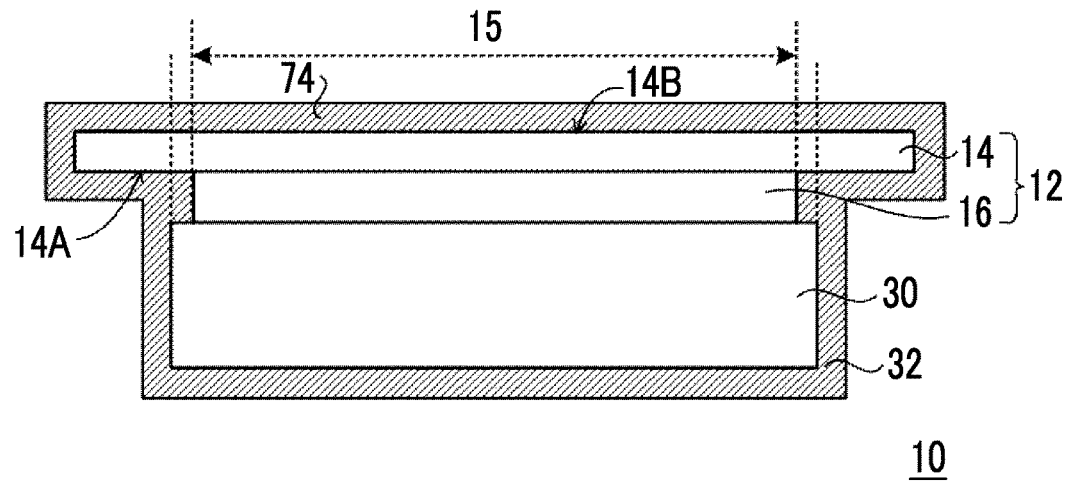
FIG. 16 is a cross-sectional view of a still further example of the radiation detector of the embodiment.

Additionally, for example, as in the radiation detector 10 illustrated in FIG. 16, the entirety (entire surface) of the sensor substrate 12 in a state where the pixels 16 and the conversion layer 30 are laminated may be covered with the protective film 32.

Figure 17:
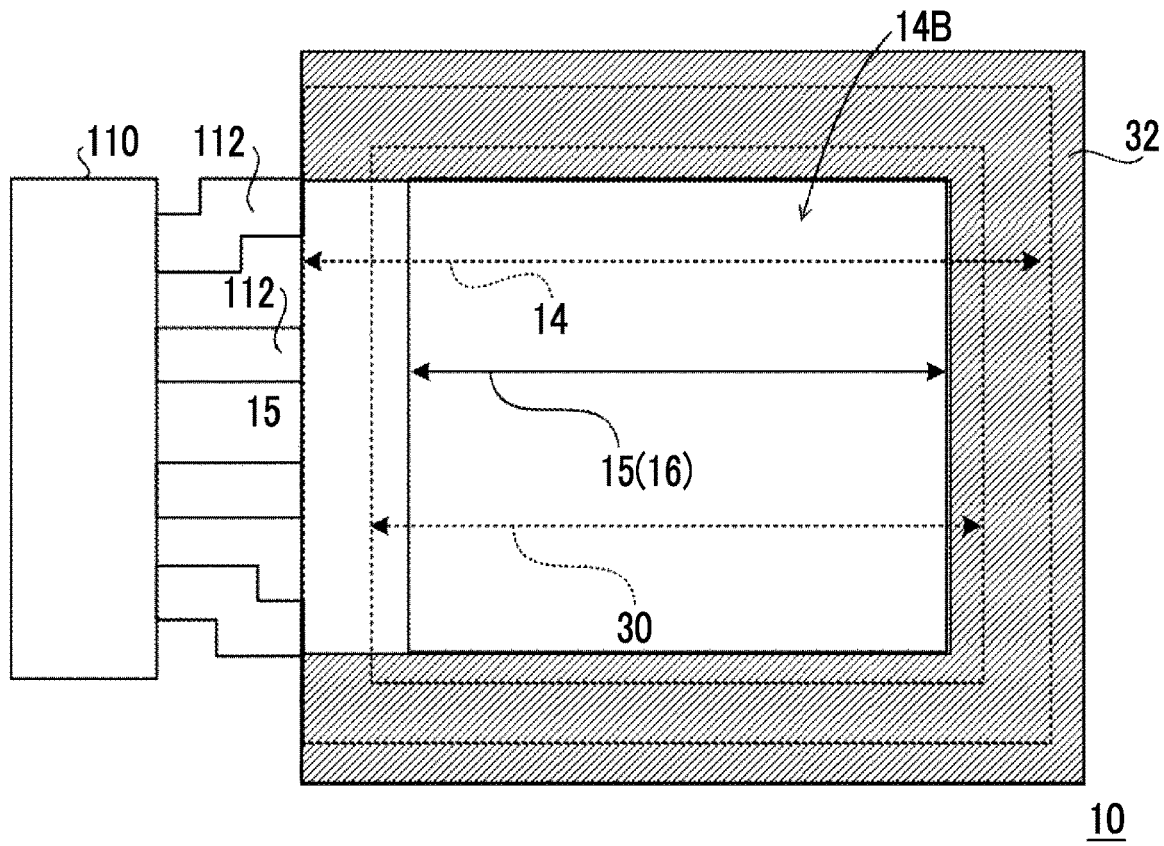
FIG. 17 is a plan view of an example of the radiation detector as seen from a side opposite to a side where a conversion layer is provided, in order to illustrate a still further example of a way of providing a protective film in the embodiment.

Additionally, for example, in each of the above embodiments, a form in which the protective film 32 wraps around the side surface 14C from the first surface 14A of the base material 14 in all the sides of the rectangular sensor substrate 12 and reaches the second surface 14B has been described. However, the wrap-around form may be adopted only in some sides of the sensor substrate 12. For example, as illustrated in FIG. 17, a form in which the protective film 32 wraps around the side surface 14C from the first surface 14A of the base material 14 in the side of the sensor substrate 12 to which the cable 112 for connecting the sensor substrate 12 and the control substrate 110 together is connected, and does not reach the second surface 14B. In other words, a form in which the protective film 32 is provided in a region where the protective film 32 does not interfere with wiring lines of the cable 112 may be adopted.

Additionally, in the radiation detector 10 of each of the above embodiments, a form in which the entire region where the pixels 16 are provided is the active area 15 has been described. However, the region used as the active area 15 is not limited to that in each of the above embodiments. For example, the active area 15 may be specified by a region corresponding to some pixels 16 among the plurality of pixels 16. For example, in the radiation detector 10, there is a case in which the pixels 16 comprises a plurality of image-forming pixels 16 substantially corresponding to pixels of a radiographic image, and a plurality of pixels 16 that have a different application in the formation of the radiographic image. In addition, the different application in the formation of the radiographic image herein means, for example, a case where the pixels are not used in the formation of the radiographic image but electrical charges thereof are discarded, in addition to a case where the pixels are used for the correction of the image. A plurality of pixels 16 having a different application may be provided at outer peripheral parts of image-forming pixels 16 in many cases. In this way, in a case where a plurality of types of pixels 16 are included, a region where the image-forming pixels 16 are determined as the active area 15.

Additionally, a case where the radiation detector 10 (radiographic imaging apparatus 1) is applied to the ISS type has been described in each of the above embodiments. However, the radiation detector 10 (radiographic imaging apparatus 1) may be applied to a so-called "penetration side sampling (PSS) type" in which the sensor substrate 12 is disposed on a side opposite to a side of the conversion layer 30 that the radiation enters, in other words, the sensor substrate 12 is disposed on a side opposite to a side, where the imaging surface 120A is provided, on the housing 120 of the radiographic imaging apparatus 1.

Additionally, in each of the above embodiments, as illustrated in FIG. 1, an aspect in which the pixels 16 are two-dimensionally arranged in a matrix has been described. However, the invention is not limited, and the pixels 16 may be one-dimensionally arranged or may be arranged in a honeycomb arrangement. Additionally, the shape of the pixels is also not limited, and may be a rectangular shape, or may be a polygonal shape, such as a hexagonal shape. Moreover, the shape of the active area 15 is also not limited.

What is claimed is:

1. A radiation detector comprising:
a sensor substrate including a flexible base material and a layer which is provided on a first surface of the base material and in which a plurality of pixels, which accumulate electrical charges generated in accordance with light converted from radiation, are formed;
a conversion layer that is provided on the first surface side of the sensor substrate to convert radiation into the light; and
a protective film that covers a portion ranging from an opposite surface of the conversion layer opposite to a side where the sensor substrate is provided, to a corresponding position, corresponding to a position of an end part of the conversion layer, on a second surface opposite to the first surface of the base material;
wherein the conversion layer includes a pixel region that is a region where the plurality of pixels are formed, on the first surface of the base material, and covers a range wider than the pixel region.

2. The radiation detector according to claim 1, wherein the protective film does not cover a region, corresponding to the pixel region, on the second surface of the base material.

3. The radiation detector according to claim 1, wherein the protective film covers a portion of a region, corresponding to the pixel region, on the second surface of the base material.

4. The radiation detector according to claim 1, wherein a position of an end part of the protective film is a position between a region, corresponding to the pixel region, on the second surface the sensor substrate, and the corresponding position.

5. The radiation detector according to claim 1, wherein the protective film includes
a first protective film that covers the opposite surface of the conversion layer and a side surface of the conversion layer, and
a second protective film that covers at least a region up to the corresponding position on the second surface of the base material, including the entire first protective film.

6. The radiation detector according to claim 1, wherein the protective film includes
a first protective film that covers the opposite surface of the conversion layer and a side surface of the conversion layer, and
a second protective film that covers a region ranging from a region including an end part of the first protective film to at least a region up to the corresponding position on the second surface of the base material.

7. The radiation detector according to claim 6, wherein the first protective film and the second protective film are bonded together with an adhesive.

8. The radiation detector according to claim 1, further comprising:
a third protective film provided on the second surface side of the base material.

9. The radiation detector according to claim 8, wherein the protective film covers up to at least a region of the third protective film corresponding to the corresponding position on the second surface of the base material.

10. The radiation detector according to claim 8, wherein the third protective film covers a region, which is not covered with the protective film, on the second surface of the base material.

11. The radiation detector according to claim 8, wherein the third protective film is at least one of a moisture resistance film or an antistatic film.

12. The radiation detector according to claim 1, further comprising:
a supporting member that supports the base material from the second surface side of the base material via the protective film.

13. The radiation detector according to claim 12, wherein the supporting member is provided outside a pixel region, which is a region where the plurality of pixels are formed, on the first surface of the base material.

14. The radiation detector according to claim 1, wherein the conversion layer includes CsI.

15. A radiographic imaging apparatus comprising:
the radiation detector according to claim 1;
a control unit that outputs control signals for reading electrical charges accumulated in the plurality of pixels;
a drive unit that outputs driving signals for reading the electrical charges from the plurality of pixels in accordance with the control signals; and
a signal processing unit to which electrical signals according to the electrical charges read from the plurality of pixels are input, and which generates and outputs image data according to the input electrical signals.

16. The radiographic imaging apparatus according to claim 15,
wherein the control unit and the radiation detector are provided side by side in a direction intersecting a lamination direction in which the base material, the layer in which the plurality of pixels are formed, and the conversion layer are arranged in the radiation detector.

17. The radiographic imaging apparatus according to claim 15, further comprising:
a power source unit that supplies electrical power to at least one of the control unit, the drive unit, or the signal processing unit,
wherein the power source unit, the control unit, and the radiation detector are provided side by side in a direction intersecting a lamination direction in which the sensor substrate, the conversion layer, and a stress neutral-plane adjusting member are arranged in the radiation detector.

* * * * *